US008244291B2

(12) United States Patent  (10) Patent No.: US 8,244,291 B2
Jorgensen  (45) Date of Patent: Aug. 14, 2012

(54) METHOD AND MOBILE STATION FOR AUTOMATIC CREATION OF TALK GROUP (75) Inventor: Niels Erik Jorgensen, Greve (DK)

(73) Assignee: Motorola Solutions, Inc., Schaumburg, IL (US)

(*) Notice: Subject to any disclaimer, the term of this patent is extended or adjusted under 35 U.S.C. 154(b) by 1129 days.

(21) Appl. No.: 10/573,007

(22) PCT Filed: Aug. 4, 2004

(86) PCT No.: PCT/EP2004/051713
§ 371 (c)(1),
(2), (4) Date: Oct. 16, 2008

(87) PCT Pub. No.: WO2005/029899
PCT Pub. Date: Mar. 31, 2005

(65) Prior Publication Data
US 2009/0054098 A1  Feb. 26, 2009

(30) Foreign Application Priority Data
Sep. 23, 2003 (GB) .................. 0322239.5

(51) Int. Cl.
*H04B 7/00* (2006.01)
(52) U.S. Cl. .................. 455/519; 455/452.1; 455/521; 455/520
(58) Field of Classification Search .................. 455/517, 455/518, 519, 520, 508, 521, 420, 456.1, 455/456.3, 452.1, 416, 90.2, 463
See application file for complete search history.

(56) References Cited

U.S. PATENT DOCUMENTS

| 5,742,904 A * | 4/1998 | Pinder et al. ............... 455/404.1 |
| 5,933,780 A | 8/1999 | Connor et al. |
| 6,002,941 A * | 12/1999 | Ablay et al. .................. 455/518 |
| 6,204,844 B1 | 3/2001 | Fumarolo |
| 6,397,054 B1 | 5/2002 | Hoirup et al. |
| 2002/0086659 A1 | 7/2002 | Lauper |
| 2002/0090954 A1 * | 7/2002 | Tanaka et al. ................. 455/456 |

FOREIGN PATENT DOCUMENTS

| GB | 2334412 A | 8/1999 |
| WO | WO 01/31964 A | 5/2001 |
| WO | WO 01/97541 A | 12/2001 |

OTHER PUBLICATIONS

International Search Report and Written Opinion for International Application No. PCT/EP2004/051713 mailed on Feb. 4, 2005.

(Continued)

*Primary Examiner* — John J Lee
(74) *Attorney, Agent, or Firm* — Indira Saladi; Barbara R. Doutre; Daniel R. Bestor (57) ABSTRACT A method of automatic creation of a talk group in a wireless radio communication system comprising a plurality of mobile stations, said method comprising the steps of: transmitting by a first mobile station an emergency message containing at least its ID and localization data; transmitting by other mobile stations their IDs and localization data in response to said emergency message; creating said talk group by selecting those mobile stations which transmitted their IDs and localization data.

27 Claims, 6 Drawing Sheets

OTHER PUBLICATIONS

Search and Examination Report mailed on Jan. 30, 2004 in Great Britain Patent Application No. GB 0322239.5.
Intention to Grant European Patent mailed on Dec. 1, 2009 in European Patent Application No. 04766418.8.
Decision to Grant mailed on Apr. 1, 2010 in European Patent Application No. 04766418.8.
International Preliminary Report on Patentability for International Patent Application No. PCT/EP2004/051713 issued on Mar. 27, 2006.

* cited by examiner

METHOD AND MOBILE STATION FOR AUTOMATIC CREATION OF TALK GROUP

This application claims the benefit of prior filed co-pending international application No. PCT/EP2004/051713 filed 4 Aug. 2004, and assigned to Motorola, Inc., which was published by the International Bureau on 31 Mar. 2005 under No. WO 2005/029899 A1 and GB application No. 0322239.5 filed 23 Sep. 2003.

FIELD OF THE INVENTION

The present invention relates to digital radio communication systems, in general, and to automatic creation of emergency talk group, in particular.

BACKGROUND OF THE INVENTION

Two-way wireless communication systems include a plurality of mobile stations (MSs), a limited number of wireless communication resources (or can be built without an infrastructure), and a communication resource controller.

Digital addressing used in these systems allows for partitioning of the plurality of MSs into talk groups. Mobile stations arranged in talk groups usually have a similar function or geographic location however other basis for partitioning is also possible. A mobile station initiating a talk group call to other mobile stations within its talk group such that the other members will receive the communication simultaneously. Selection of talk group programmed into the mobile station allows the user to select and operate on one of many possible talk groups at any instant in time. This functionality of talk groups is important and very useful especially in public safety applications.

Ability of simultaneous communication with plurality of other MSs is particularly important in emergency situations.

One method of controlling operation of mobile stations known in the art is to rely on a dispatcher. Verbal or text messages are broadcasted from the dispatcher to all mobile stations in the talk group. In emergency situations, e.g. in case of an accident it takes time for the dispatcher to create a talk group and to assign as well as communicate the messages to the personnel closest to an incident. Such method causes some delay as usually additional exchange of information is required.

SUMMARY OF THE INVENTION

There is a need for a method of automatic creation of a talk group in a digital radio communication system and for a mobile station for use in such communication system, which alleviate or overcome the disadvantages of the prior art.

According to a first aspect of the present invention there is thus provided a method of automatic creation of a talk group in a digital radio communication system as claimed in claim 1.

According to a second aspect of the present invention there is thus provided a mobile station for use in a digital radio communication as claimed in claim 18.

The present invention beneficially allows for short-cutting the manually process of coordinating a dispatch in response to an emergency message, by immediately and automatically creating a talk group which may provide support to the unit sending the emergency message and automatically adding the closest emergency service unit (or units) to the dynamically created talk group.

BRIEF DESCRIPTION OF THE DRAWINGS

The present invention will be understood and appreciated more fully from the following detailed description taken in conjunction with the drawings in which.

DETAILED DESCRIPTION OF AN EMBODIMENT OF THE INVENTION

The term a dispatch centre herein below refers to a specialized radio communication unit, preferably equipped with additional computer operated support units, which is adapted to control at least portion of mobile stations of a communication system The term infrastructure herein below refers to hardware and software elements that forms a communication network and allow for transmitting voice and/or data over the radio channel(s).

Figure 1:
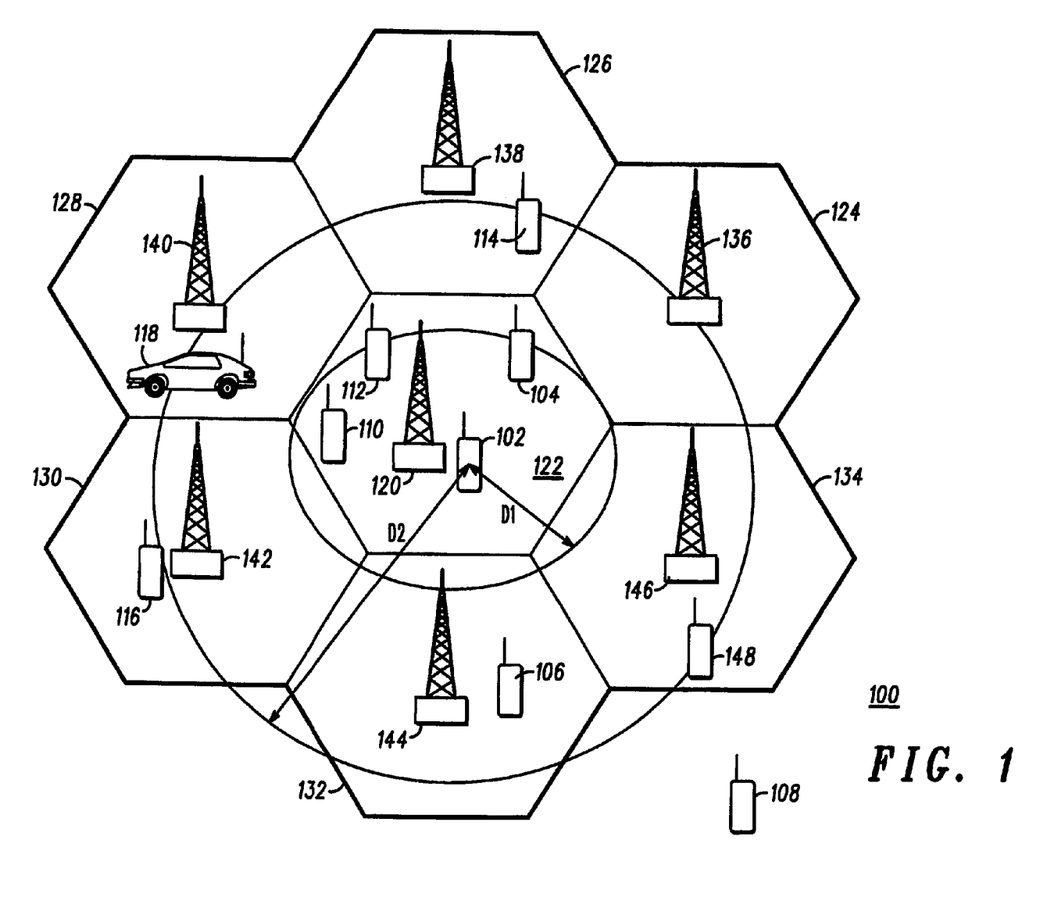
FIG. 1 is a schematic illustration of a communication system operating in accordance with one embodiment of the present invention.

Referring to FIG. 1 one embodiment of a wireless communication system 100 according to the present invention is shown. The communication system comprises a plurality of mobile stations (MSs) 102-116, a dispatch centre 148 and an infrastructure 120, 136-146, which allows for communication in trunking mode as well as in direct mode. Alternatively the communication system 100 may comprise only the plurality of MSs 102-116 and said dispatch centre.

The invention allows for automatic creation of a talk group in a wireless communication system 100 in a situation when a user of one of said MSs 102-116 is in an emergency situation or is a witness of an emergency situation (e.g. a car accident).

Figure 2:
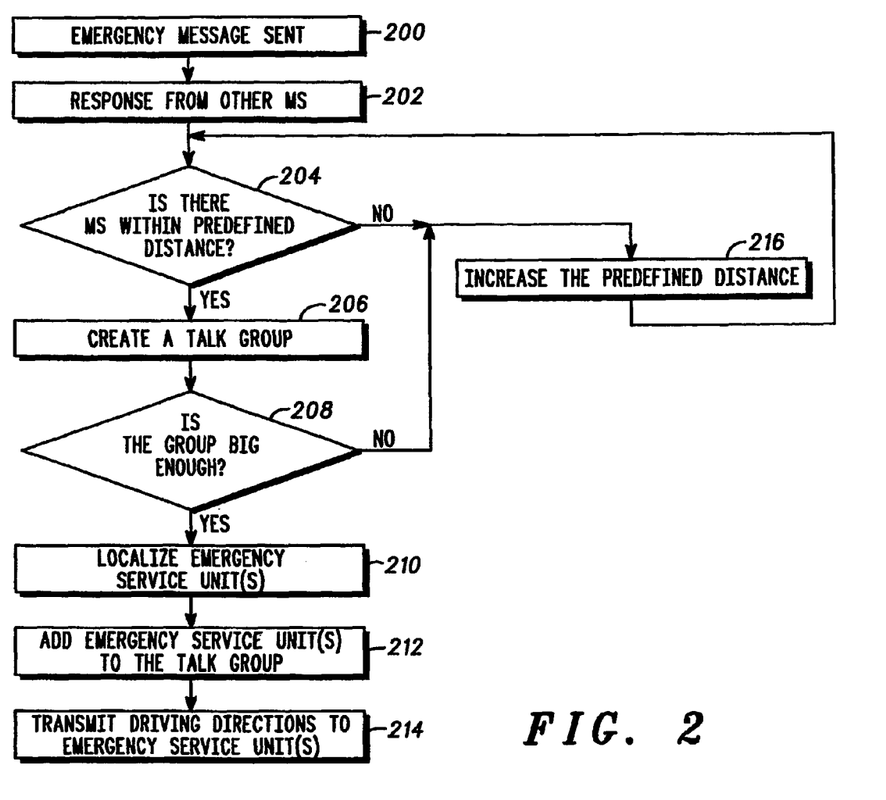
FIG. 2 is a flow chart illustrating a method of automatic creation of a talk group in a first embodiment of the present invention.
Figure 6:
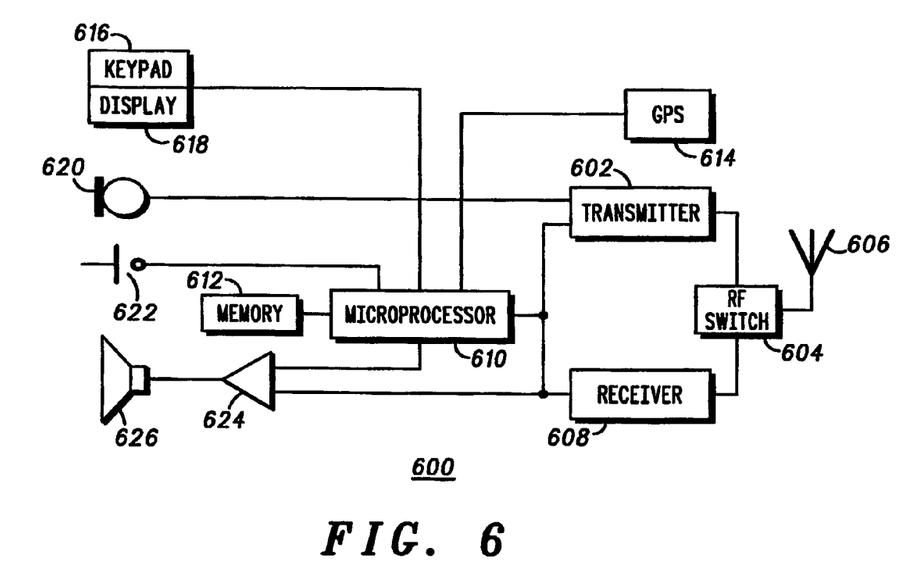
FIG. 6 is a block diagram of a mobile station in one embodiment of the present invention.

With reference to FIG. 2 and FIG. 6 one embodiment of a method of automatic creation of a talk group according to the present invention is shown. When a user of a first mobile station 102 is in an emergency situation and presses a dedicated button on the first MS 102 an emergency message is transmitted over the air 200 on a broadcast channel. Said emergency message contains at least an ID of the mobile station 102, identification that this is an emergency message and current geographical localization of the transmitting MS. Said emergency message may optionally contain a short indication what type of emergency service is required (e.g. police, an ambulance, a fire brigade, etc). Transmitting this additional information could require manual typing by the user or choosing from the list stored in a memory 612 of the MS 600. Other mobile stations 104-116, after receiving said message, automatically transmit 202 their IDs and localization data also on said broadcast channel. In a next step 204, 206 those MSs which transmitted their IDs and localization data and are located within a predefined distance D1 from said first mobile station 102 are selected to a talk group.

Alternatively all MSs that replied to said emergency message are selected to said talk group.

If there is no MS within said predefined distance or the number of MSs within said predefined distance is too small 208 said predefined distance D1 is increased 216 to D2 and other MSs located within distance D2 are selected to said talk group.

In one embodiment said selection 204, 206 is performed by said first mobile station, which is equipped with a microprocessor 610 and a memory 612. Said IDs and localization data received in response to said emergency message are stored in said memory 612 and said microprocessor 610 is adapted to calculate the distances between said first mobile station and any one of said other mobile stations which have responded to said emergency message and then create a talk group comprising other mobile stations based on said calculated distances. This embodiment is applicable to communication systems without an infrastructure or to a situation when infrastructure is not used.

Alternatively for a communication system with an infrastructure said step of selecting MSs to said talk group is performed by said infrastructure 120, 136-146.

When said talk group is created or at the time of selecting said MSs to said talk group an emergency service unit 118 is localized 210 and selected 212 to said talk group. The emergency service unit 118 closest to said first mobile station is selected even if its distance is bigger than the predefined distance D1. If the emergency situation requires it is possible that more that one emergency service unit is selected to said talk group.

For communication systems with said infrastructure 120, 136-146 a dispatch centre 148 transmits driving directions to said emergency service unit (or units) 118.

Figure 3:
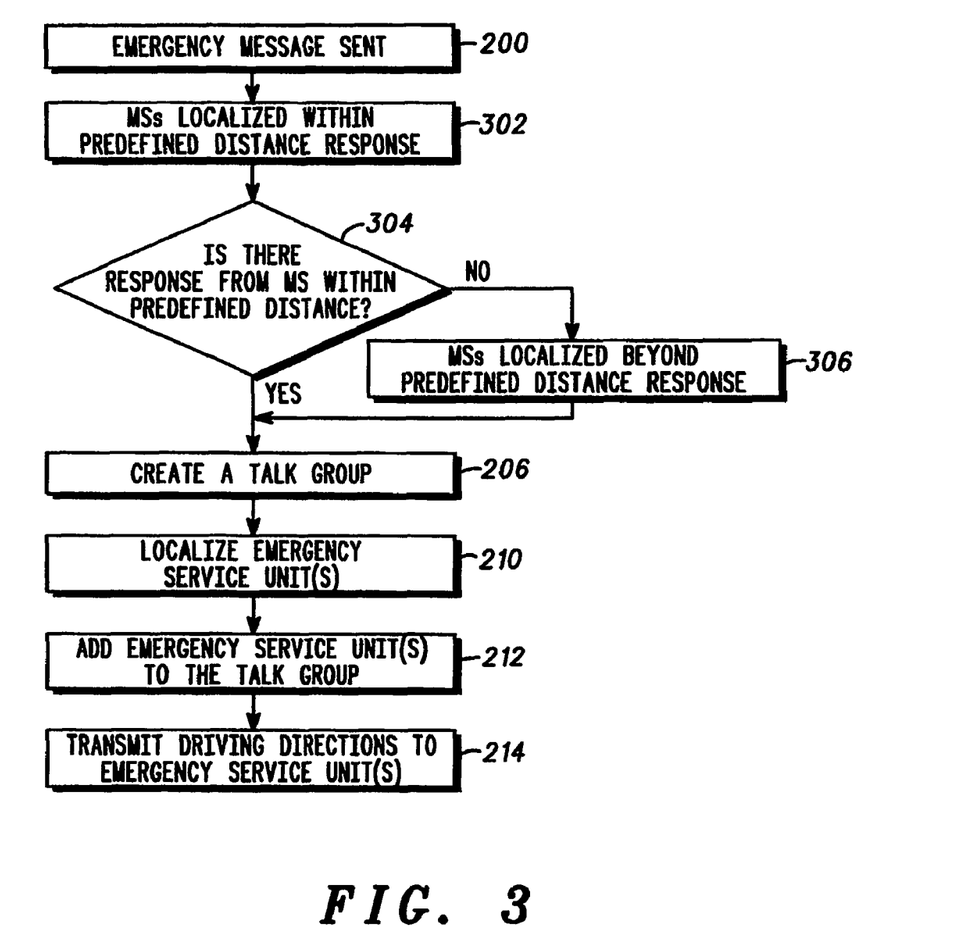
FIG. 3 is a flow chart illustrating a method of automatic creation of a talk group in a second embodiment of the present invention.

Referring to FIG. 3 and FIG. 6 a second embodiment of a method of automatic creation of a talk group according to the present invention is shown. When a user of a first mobile station 102 is in an emergency situation and presses a dedicated button on the first MS 102 an emergency message is transmitted over the air 200. Other mobile stations 104-116, after receiving said message, automatically transmit 202 their IDs and localization data but only if they are localized within a predefined distance D1 from said first mobile station. If there is response from said other MSs 304 a talk group is being created 206. If there is no other mobile station within said predefined distance D1 from said first mobile station 304 said other mobile stations, which distance from said first mobile station is larger than said predefined distance D1, transmit their ID and localization data 306 in response to said emergency message. As the emergency message and the responses are transmitted on the broadcast channel said other MSs listen to messages transmitted over the air and they know that no response was transmitted to said emergency message. They reply if there was no response from within D1 within a predefined period of time.

In alternative embodiments said response messages can be transmitted also over a dedicated channel.

After creation of said talk group or at the time of selecting MSs to said talk group, which can be done in the same way as in case of the first embodiment described above, a closest emergency service unit (or units) 118 is localized 210 and selected 212 to said talk group.

For communication systems with an infrastructure 120, 136-146 a dispatch centre 148 transmits driving directions to said emergency service unit (or units) 118.

For communication systems with infrastructure said selection 304, 206, 210, 212 is being done by said infrastructure or by a dispatch centre 148 and for communication systems without infrastructure or when infrastructure is not used said selection is being done by said first mobile station 102.

Figure 4:
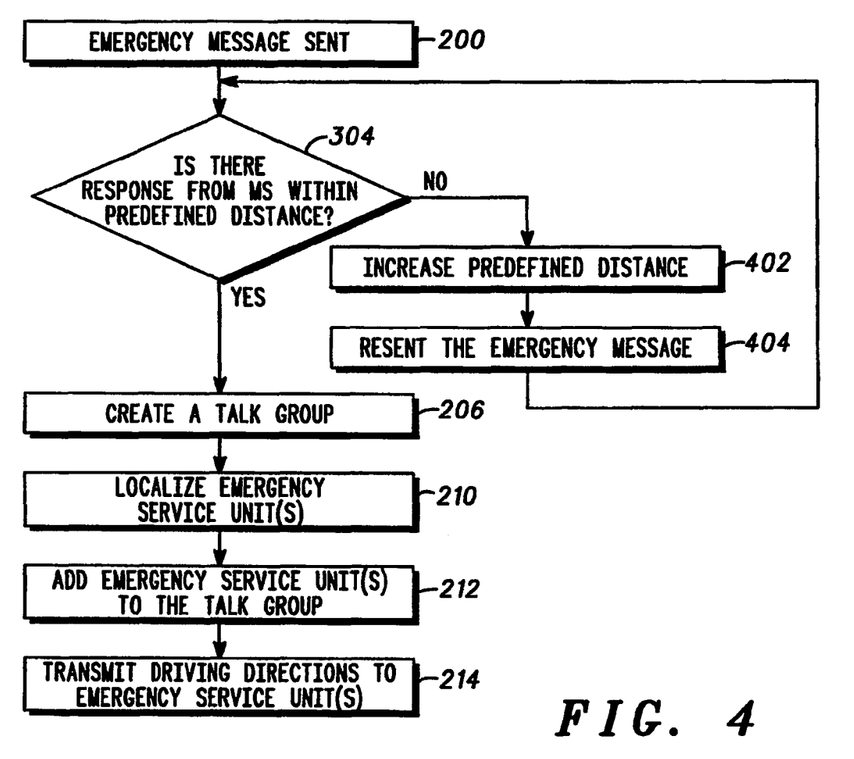
FIG. 4 is a flow chart illustrating a method of automatic creation of a talk group in a third embodiment of the present invention.

With reference to FIG. 4 and FIG. 6 a third embodiment of a method of automatic creation of a talk group according to the present invention is shown. When a user of a first mobile station 102 is in an emergency situation and presses a dedicated button on the first MS 102 an emergency message is transmitted over the air 200 on a broadcast channel. Other mobile stations 104-116, after receiving said message, automatically transmit 202 their IDs and localization data but only if they are localized within a predefined distance D1 from said first mobile station. If there is no response 304 to said emergency message said predefined distance is increased 402 and said emergency message is transmitted again 404. (The other mobile stations 106, 108, 114, 116 located beyond said predefined distance transmit their IDs and localization data if they receive the same emergency message transmitted again.) If there is a response from at least portion of said other mobile stations 106, 108, 114, 116, the talk group is being created which consist of the first mobile station 102 and other mobile stations that responded to said emergency message.

After creation of said talk group or at the time of selecting MSs to said talk group, which can be done in the same way as in case of the first embodiment described above, a closest emergency service unit (or units) 118 is localized 210 and selected 212 to said talk group.

For communication systems with an infrastructure 120, 136-146 a dispatch centre 148 transmits driving directions to said emergency service unit (or units) 118.

For communication systems with said infrastructure 120, 136-146 said selection 304, 206, 210, 212 is being done by said infrastructure 120, 136-146 or by said dispatch centre 148 and for communication systems without said infrastructure or when said infrastructure is not used said selection is being done by said first mobile station 102.

Figure 5:
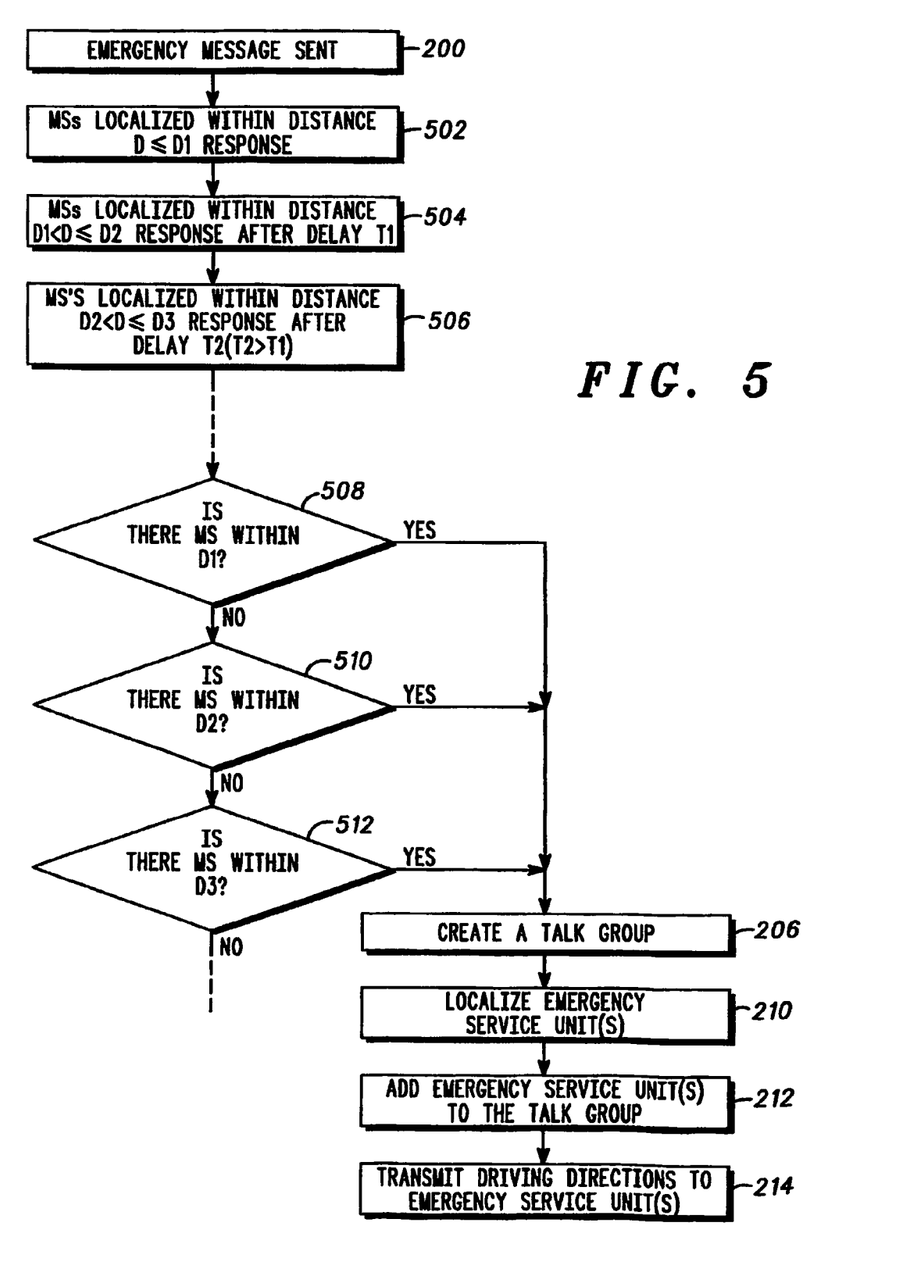
FIG. 5 is a flow chart illustrating a method of automatic creation of a talk group in a fourth embodiment of the present invention.

With reference to FIG. 5 and FIG. 6 a fourth embodiment of a method of automatic creation of a talk group according to the present invention is shown. When a user of a first mobile station 102 is in an emergency situation and presses a dedicated button on the first MS 102 an emergency message is transmitted over the air 200 on a broadcast channel. Other mobile stations 104-116, after receiving said message, automatically transmit 202 their IDs and localization data. Said other mobile stations 104-116 transmit their responses 502, 504, 506 with some delay and the value of said delay depends on the distance from said first mobile station to any one of said of the mobile stations 104-116. A relation between said delay and said distance is presented in Table 1. It is obvious that the delay may be increased in many different ways and the one presented in Table 1 is an example only.

TABLE 1

| Distance D | Delay |
|---|---|
| D ≦ D1 | No delay |
| D1 < D ≦ D2 | T1 |
| D2 < D ≦ D3 | 2 × T1 |
| . . . | . . . |

If there is a response from the other mobile stations located within distance D1 said other mobile stations are selected and said talk group is created 206. If there is no other mobile station 508 within distance D1 from said first mobile station 102 other mobile stations located within distance D2 are selected and said talk group is created 206. If there is no other mobile station 510 within distance D2 other mobile stations located within distance D3 are selected and said talk group is created 206. This procedure may be repeated as long as at least one of the other mobile stations will be found within some predefined distance from said first mobile station 102.

After creation of said talk group or at the time of selecting MSs to said talk group, which can be done in the same way as in case of the first embodiment described above, a closest emergency service unit (or units) 118 is localized 210 and selected 212 to said talk group.

For communication systems with an infrastructure 120, 136-146 a dispatch centre 148 transmits driving directions to said emergency service unit (or units) 118.

For communication systems with said infrastructure 120, 136-146 said selection 508, 510, 512, 206, 210, 212 is being done by said infrastructure 120, 136-146 or by a dispatch centre 148 and for communication systems without infrastructure or when infrastructure is not used said selection is being done by said first mobile station 102.

Alternatively for communication systems with the infrastructure, when the talk group is created, information on the talk group (including IDs of members of the talk group and their localization data) can be transmitted to a dispatch centre 148. After this transfer the dispatch centre 148 takes over control of the talk group.

Importantly, an advantage of this invention is that by limiting the number of said other mobile stations that respond at the same time (e.g. only those MSs located within predefined distance are allowed to respond or by introducing delay for transmitting response, etc.) allows for limitation of the risk of system congestion.

The localization data transmitted by said first mobile station and said other mobile stations are data obtained via GPS system or calculated based on triangulation data. It is obvious for those skilled in the art that other localization/positioning system's data may be used.

In those embodiments where the communication system operates in trunking mode, said predefined distance can be limited to the borders of a cell 122 or to the borders of a group of cells 124-134 within which said first mobile station is located. However actual distance measured in length units may also be applied.

It is obvious for those skilled in the art that the mobile unit can be either a portable or mobile radio.

Referring to FIG. 6 one embodiment of a mobile station capable of operating in accordance with the disclosed method is depicted. The mobile station of FIG. 6 may be either a portable- or a mobile digital or analog radio. The mobile station 600 comprises a microphone 620 which provides a signal for transmission by transmission circuit 602. Transmission circuit 602 transmits via Radio Frequency (RF) switch 604 and antenna 606. The mobile station 600 also has a microprocessor 610 and a memory 612. The mobile station 600 also comprises a display 618 and keypad 616. Voice activation of the radio, or other means of interaction with a user, may also be implemented. Signals received by the radio are routed by the RF switch 604 to a receiving circuit 608. The received signals are routed from the receiving circuit 608 to microprocessor 610 and audio processing circuitry 624 and 626. A localization circuitry 614, which in one embodiment may be a GPS circuitry is connected to said microprocessor 610. A dedicated emergency switch 622 is also connected to said microprocessor 610.

In operation said emergency switch 622 when activated initiate the microprocessor to transmit an emergency message which contains at least indication that this is an emergency message, ID of said mobile station and current geographical position of said mobile station. Said geographical position is provided by said localization circuitry 614. When said communication 600 unit receives an emergency message said microprocessor calculates distance between said mobile station and another mobile station, which has sent the emergency message. For these calculations the microprocessor uses localization data received in said emergency message and obtained from said localization circuitry 614. Depending on the result of calculations and on the embodiment of the method according to the present invention used the microprocessor initiate transmission of the response message (containing ID and its localization data) or not.

When said mobile station 600 receives messages with said IDs and localization data in response to said emergency message the microprocessor 610 stores them in a memory 612. The microprocessor 610 uses the data stored in the memory 612 to calculate distances between said first mobile station and any one of said other mobile stations which have responded to said emergency message. Next the microprocessor selects to a talk group those of said other mobile stations, which are located within a predefined distance from the mobile station, which transmitted the emergency message. When the selection is completed the talk group is created.

In any of the embodiments the dispatch centre 148 is preferably added to said talk group.

It is worth to emphasise that all these embodiments of the method according to the present invention may be implemented in a communication system with an infrastructure (for communication in direct mode as well as in trunking mode) or without an infrastructure. In implementation in a communication system with an infrastructure selection of MSs to the talk group is done by said infrastructure (e.g. zone controller). Said calculation of distance can be done by either by the infrastructure or by the MSs. When the method is implemented in a communication system without infrastructure or when the infrastructure is not used then selection of MSs to the talk group and calculation of the distances is done by said the first mobile station (some calculations are also to be done by the other mobile stations). It is also possible that the steps of calculation and selection are performed by said first mobile station and said step of transmitting directions 214 to said emergency service unit (or units) is performed by a dispatch centre 148.

The invention claimed is:

1. A method of automatic creation of a talk group in a wireless radio communication system comprising a plurality of mobile stations, said method comprising:
   transmitting by a first mobile station an emergency message, wherein said emergency message comprises a first mobile station ID, localization data, and an indication that said emergency message is an emergency message;
   transmitting by other mobile stations said other mobile stations IDs and localization data in response to said emergency message;
   creating said talk group by selecting said other mobile stations which transmitted said other mobile stations IDs and localization data.

2. A method according to claim 1, wherein only said mobile stations, which are within a predefined distance from said first mobile station, transmit said other mobile stations IDs and localization data.

3. A method according to claim 2, wherein for the radio communication system operating in trunking mode, said predefined distance is limited to the borders of a cell within which said first mobile station is located or to a group of cells.

4. The method according to claim 2, wherein said other mobile stations, within a distance from said first mobile station larger than said predefined distance, transmit said other mobile stations IDs and localization data only if there is no other mobile station within said predefined distance.

5. The method according to claim 2, further comprising:
increasing said predefined distance if no one of said other mobile stations responded to said emergency message; and
re-sending said emergency message.

6. The method according to claim 1, wherein said other mobile stations transmit said other mobile stations IDs and localization data with a predefined delay and said predefined delay increases with increasing distance from said first mobile station.

7. The method according to claim 1, wherein only those of said other mobile stations which are within a predefined distance from said first mobile station are selected to said talk group.

8. The method according to claim 7, wherein some of said other mobile stations, which are located beyond said predefined distance, are selected to said talk group if there is no one mobile station of said other mobile stations within said predefined distance or the number of said other mobile stations is below a predefined threshold.

9. The method according to claim 1, wherein after receiving said IDs and localization data of said other mobile stations, said step of selecting is performed by said first mobile station.

10. The method according to claim 9, wherein after creation of talk group information on said talk group, said talk group information is transmitted to a dispatch centre, said talk group information includes IDs of members of said talk group and said other mobile stations localization data.

11. The method according to claim 10, further comprising the dispatch centre transmitting driving directions to said emergency service unit.

12. The method according to claim 1, wherein after receiving said IDs and localization data of said other mobile stations, said step of selecting is performed by an infrastructure device.

13. The method according to claim 1, further comprising adding at least one emergency service unit, determined to be located closest to said first mobile station, to said talk group.

14. The method according to claim 1, wherein said localization data are Global Positioning System Data or triangulation based data.

15. The method according to claim 1, wherein said emergency message comprises an indication of a type of emergency service being requested.

16. The method according to claim 1, wherein said emergency message is transmitted to a dispatch centre, and said dispatch centre forwards said emergency message to said other mobile stations.

17. The method according to claim 1, wherein said dispatch centre is also added to said talk group.

18. A mobile station comprising means for signal transmission, means for signal reception, a microphone, an audio processing circuitry, a keypad, a microprocessor, a memory, a localization circuitry, and emergency switch means being adapted to (i) initiate broadcast of an emergency message, said emergency message comprising localization data, an ID of said mobile station and an indication that said emergency message is an emergency message, and to (ii) initiate creation of a talk group comprising all or a subset of other mobile stations responding to said broadcast emergency message.

19. The mobile station according to claim 18 being adapted to wirelessly receive a second emergency messages directly from one of the other mobile stations.

20. The mobile station according to claim 19 being adapted to send its ID and localization data in response to the second emergency message.

21. The mobile station according to claim 18 being adapted to wirelessly receive responses to the emergency message directly from said other mobile stations.

22. The mobile station according to claim 18, wherein said microprocessor being adapted to calculate distances between said mobile station and each one of the responding mobile stations.

23. The mobile station according to anyone of claim 18, wherein said microprocessor is adapted to store in said memory localization data and IDs received from each one of the responding mobile stations.

24. The mobile station according to claim 23, wherein said microprocessor is adapted to calculate distances between said first mobile station and each one of the responding mobile stations and to select all or the subset of the responding mobile stations for the talk group based on said calculated distances.

25. The mobile station according to claim 18 wherein said localization circuitry is a Global Positioning System unit.

26. The mobile station according to anyone of claim 18 wherein said microprocessor is adapted to calculate localization of said mobile station based on triangulation data.

27. An infrastructure device in a wireless communications system configured to:
receive, from a first mobile station, an emergency message, wherein said emergency message comprises a first mobile station ID, localization data, and an indication that said emergency message is an emergency message;
receive, from other mobile stations, other mobile stations IDs and localization data transmitted by the other mobile stations in response to the emergency message;
dynamically creating a talk group by selecting all or a subset of the responding other mobile stations which transmitted said other mobile stations IDs and localization data.

* * * * *

UNITED STATES PATENT AND TRADEMARK OFFICE
CERTIFICATE OF CORRECTION

PATENT NO. : 8,244,291 B2
APPLICATION NO. : 10/573007
DATED : August 14, 2012
INVENTOR(S) : Jorgensen Page 1 of 1

It is certified that error appears in the above-identified patent and that said Letters Patent is hereby corrected as shown below:

In Column 6, Line 57, in Claim 2, delete "A method" and insert -- The method --, therefor.

In Column 6, Line 61, in Claim 3, delete "A method" and insert -- The method --, therefor.

In Column 8, Line 12, in Claim 19, delete "messages" and insert -- message --, therefor.

In Column 8, Line 24, in Claim 23, delete "to anyone of" and insert -- to --, therefor.

In Column 8, Line 36, in Claim 26, delete "to anyone of" and insert -- to --, therefor.

Signed and Sealed this
Eighth Day of January, 2013

David J. Kappos
*Director of the United States Patent and Trademark Office*